US008608962B2

(12) United States Patent
Boettcher

(10) Patent No.: US 8,608,962 B2
(45) Date of Patent: Dec. 17, 2013

(54) SQUARE INK FILTER VESSEL FOR A PRINTING PRESS

(75) Inventor: Steven E. Boettcher, Appleton, WI (US)

(73) Assignee: Flxon Incorporated, Charlotte, NC (US)

( * ) Notice: Subject to any disclaimer, the term of this patent is extended or adjusted under 35 U.S.C. 154(b) by 508 days.

(21) Appl. No.: 12/859,797

(22) Filed: Aug. 20, 2010

(65) Prior Publication Data

US 2011/0041714 A1 Feb. 24, 2011

Related U.S. Application Data

(60) Provisional application No. 61/235,804, filed on Aug. 21, 2009.

(51) Int. Cl.
*B01D 29/11* (2006.01)
*B01D 35/06* (2006.01)

(52) U.S. Cl.
USPC ........... 210/223; 210/232; 210/295; 210/452; 210/453; 210/455; 210/484

(58) Field of Classification Search
USPC .......... 210/223, 232, 295, 452, 453, 455, 484
See application file for complete search history.

(56) References Cited

U.S. PATENT DOCUMENTS

| | | | | |
|---|---|---|---|---|
| 4,283,281 | A * | 8/1981 | Cogan | 210/484 |
| 4,585,553 | A * | 4/1986 | Hikosaka et al. | 210/223 |
| 5,139,672 | A * | 8/1992 | Ohbayashi | 210/452 |
| 6,086,758 | A * | 7/2000 | Schilling et al. | 210/484 |

* cited by examiner

*Primary Examiner* — David A Reifsnyder
(74) *Attorney, Agent, or Firm* — Hammer & Associates, P.C.

(57) ABSTRACT

A square ink filter vessel for a printing press, like a rotogravure printing press, a flexographic printing press, or other like printing presses, includes a container having a substantially rectangular shaped cross-section with an open top, an outlet port on one side approximate the bottom of the container, a sloped bottom, where the sloped bottom being toward the outlet port, an inlet port on one side approximate the top of the container, and an internal ledge. A lid is adapted to close the open top of the container. A hinge couples the lid to the container, where the lid is hinged to the container on one side. A lid compression device is adapted to compress the lid to the container. A containment basket is adapted to fit inside the container, and has a plurality of holes on all sides and a lip adapted to rest on the internal ledge of the container.

18 Claims, 10 Drawing Sheets

SQUARE INK FILTER VESSEL FOR A PRINTING PRESS

RELATED APPLICATION

This application claims the benefit of provisional application Ser. No. 61/235,804 filed Aug. 21, 2009.

FIELD OF THE INVENTION

The instant invention relates to an ink filter vessel for a printing press, namely, a square ink filter vessel for a printing press, like a rotogravure printing press or a flexographic printing press.

BACKGROUND OF THE INVENTION

Printing presses require the ink to be filtered before entering the printing operations. Typically, an ink filter vessel is positioned somewhere in each ink line to filter each ink used in the printing process. These ink filter vessels are typically cylindrically shaped or torpedo shaped (see FIG. 1 of the prior art). This cylindrical or torpedo shape requires the ink filter vessel to have a height of at least 18 inches in order to provide adequate filtering surface area. This height requires a large volume of ink to be pumped into the vessel. In addition, printing presses are very complex and intricate machines with very little open space. As such, mounting these tall or long filtering vessels is rather difficult and sometimes impossible. As such, there is a need for a ink filter vessel for a printing press, like a rotogravure printing press, a flexographic printing press, or other printing presses, with a smaller profile that can be more easily installed in a printing press.

Furthermore, these torpedo-shaped ink filter vessels have lids that are attached on opposite sides by tightening a nut to the lid on both sides. This is very difficult and time consuming. As such, there is a need for an ink filter vessel for a printing press that includes a lid that is easily and quickly attached to the ink filter vessel.

The instant invention is designed to provide an ink filter vessel for a printing press that addresses all the problems mentioned above.

SUMMARY OF THE INVENTION

The instant invention includes a square ink filter vessel for a printing press, like a rotogravure printing press, a flexographic printing press, or other similar printing presses. The square ink filter vessel includes: a container, a lid, a hinge, a lid compression device, and a containment basket. The container has a substantially rectangular shaped cross-section with an open top, an outlet port on one side approximate the bottom of the container, a sloped bottom, where the sloped bottom being toward the outlet port, an inlet port on one side approximate the top of the container, and an internal ledge. The lid is adapted to close the open top of the container. The hinge couples the lid to the container, where the lid is hinged to the container on one side. The lid compression device is adapted to compress the lid to the container. The containment basket is adapted to fit inside the container, and has a plurality of holes on all sides and a lip adapted to rest on the internal ledge of the container.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
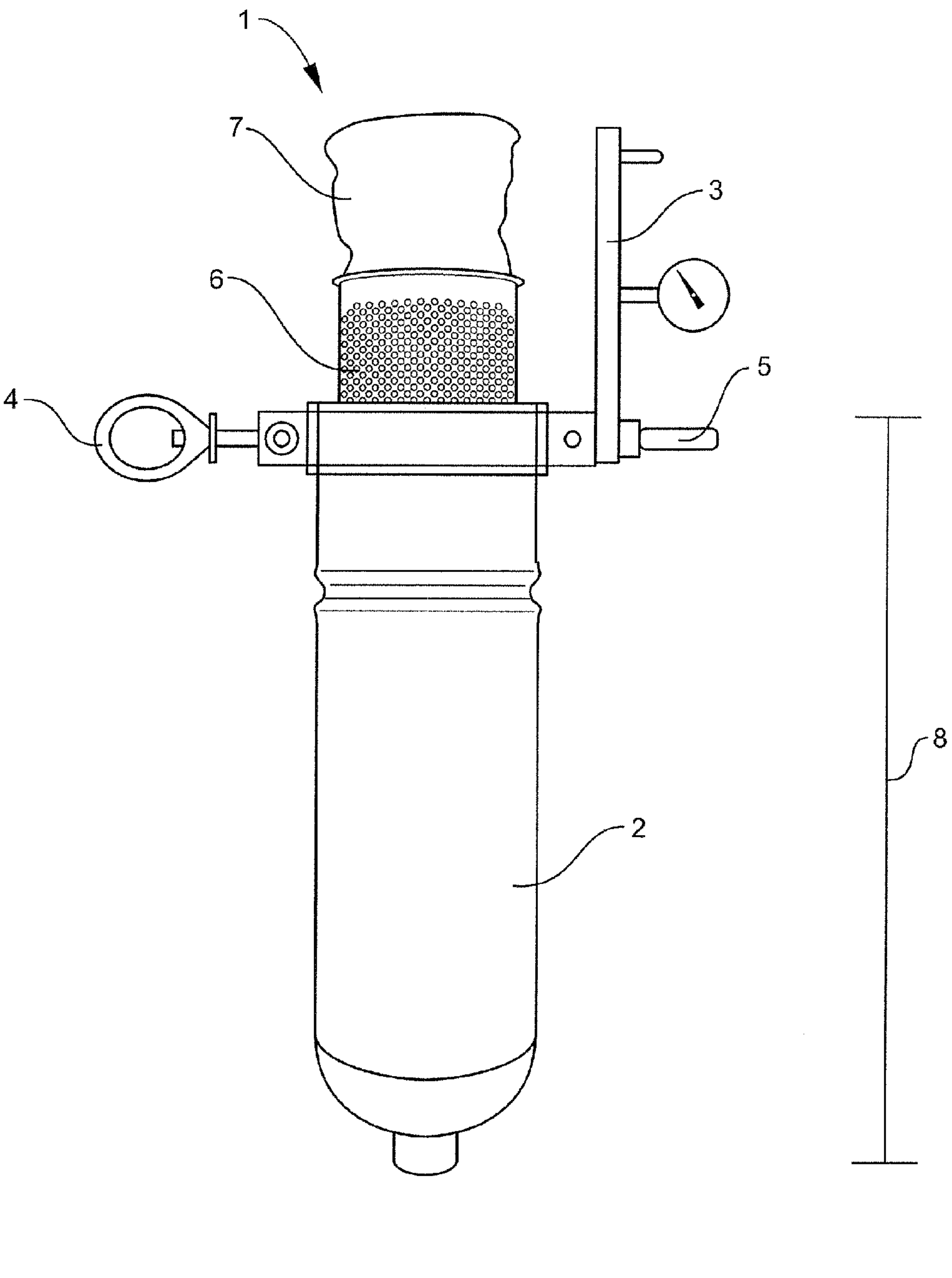
Figure 1 (PRIOR ART)
FIG. 1 shows a perspective view of the torpedo shaped ink filter vessel according to the prior art.
Figure 2:
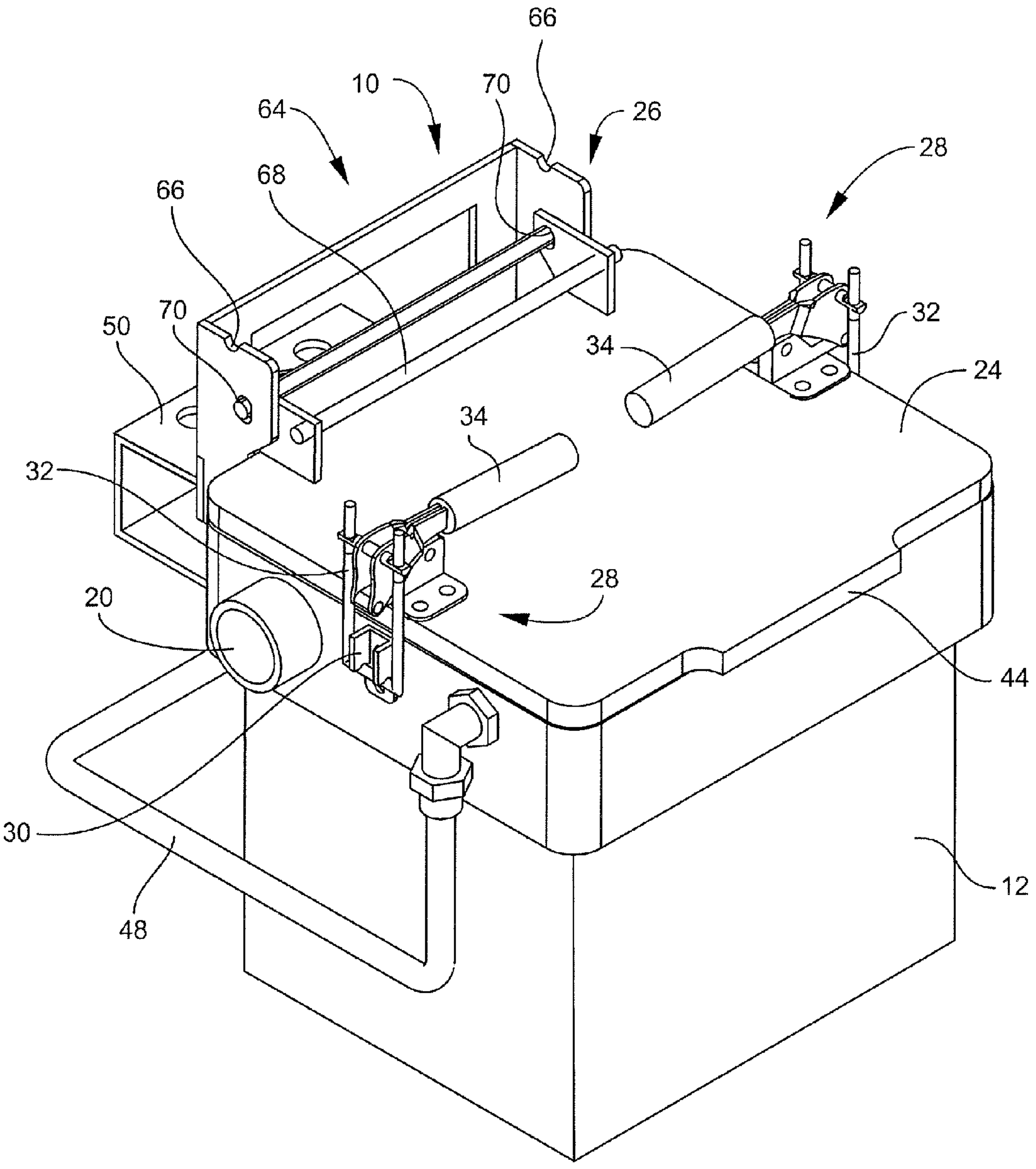
FIG. 2 shows a front perspective view of one embodiment of the square ink filter vessel for a printing press according to the instant invention.
Figure 3:
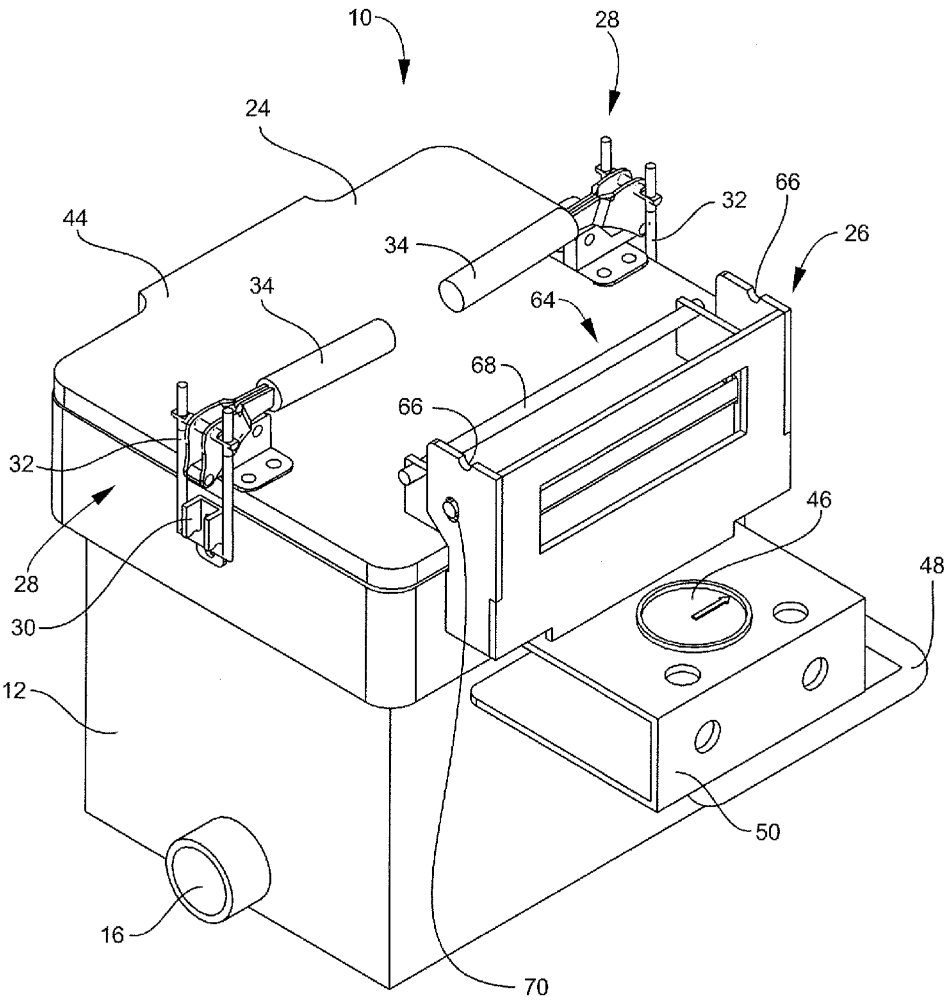
FIG. 3 shows a back perspective view of the embodiment of the square ink filter vessel for a printing press shown in FIG. 2.
Figure 4:
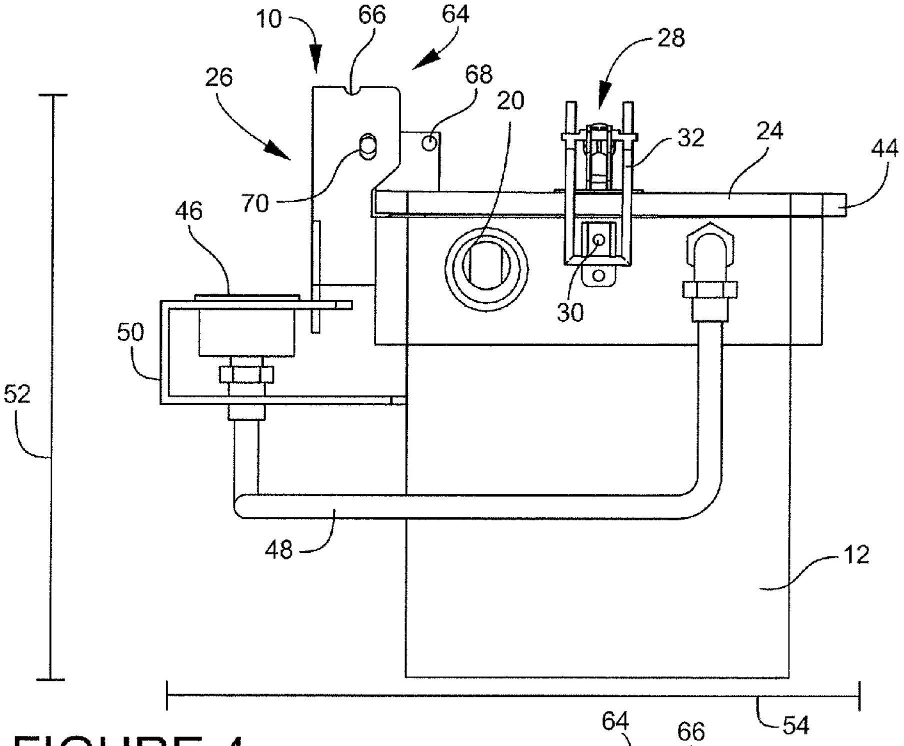
FIG. 4 shows a left side view of the embodiment of the square ink filter vessel for a printing press shown in FIG. 2.
Figure 5:
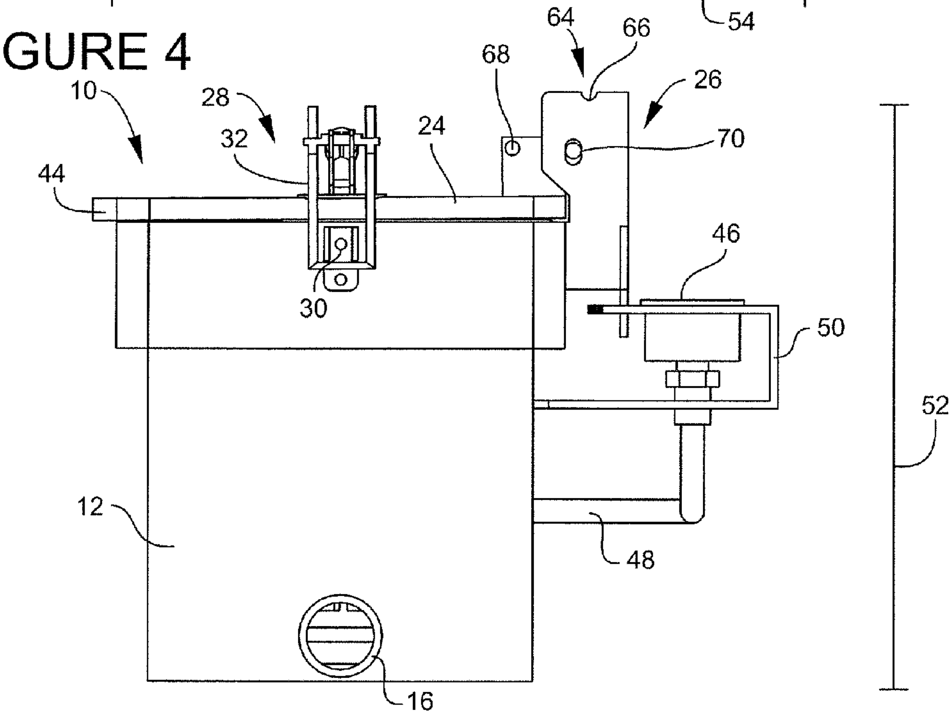
FIG. 5 shows a right side view of the embodiment of the square ink filter vessel for a printing press shown in FIG. 2.
Figure 6:
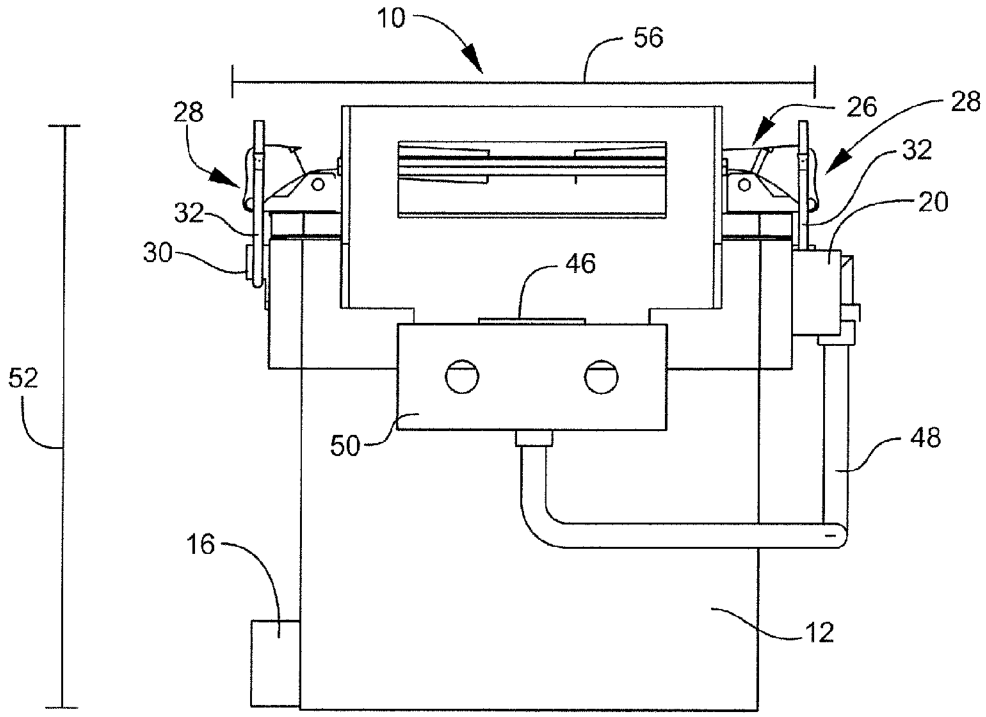
FIG. 6 shows a rear view of the embodiment of the square ink filter vessel for a printing press shown in FIG. 2.
Figure 7:
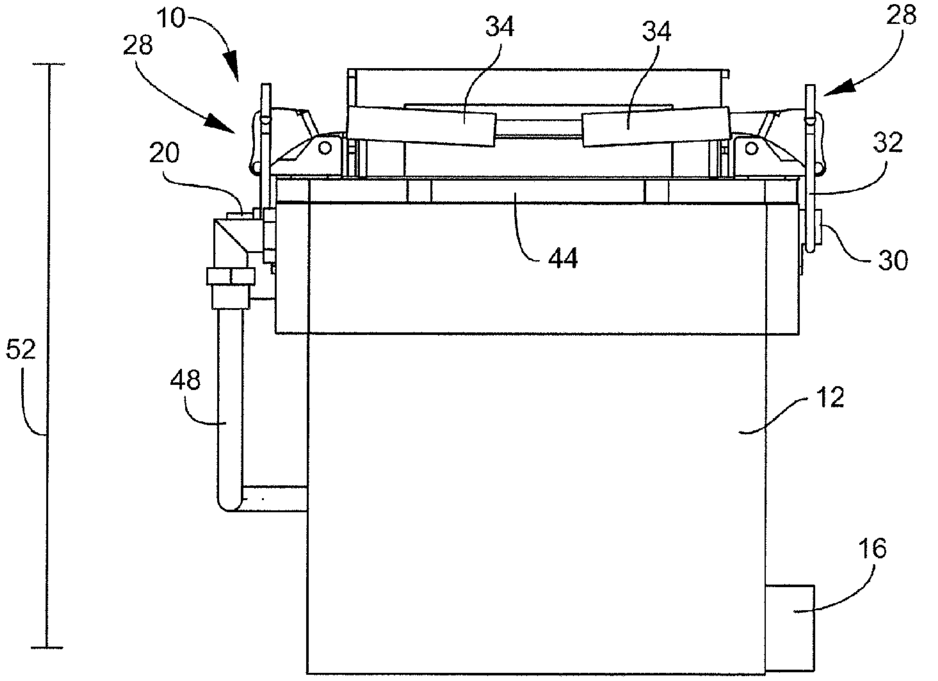
FIG. 7 shows a front view of the embodiment of the square ink filter vessel for a printing press shown in FIG. 2
Figure 8:
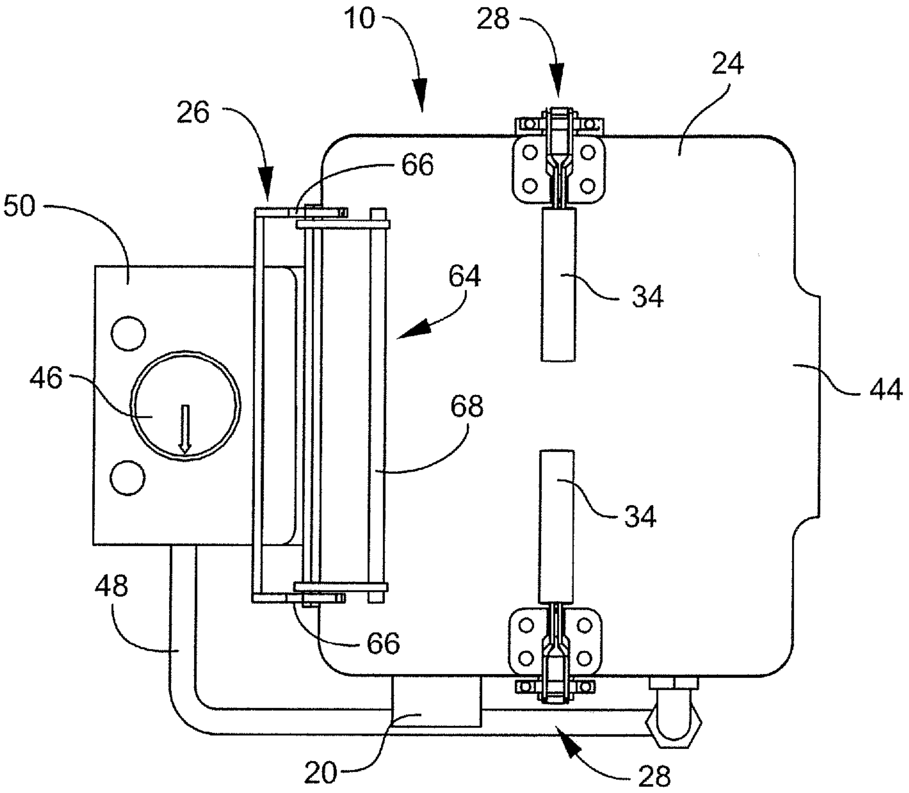
FIG. 8 shows a top view of the embodiment of the square ink filter vessel for a printing press shown in FIG. 2.
Figure 9:
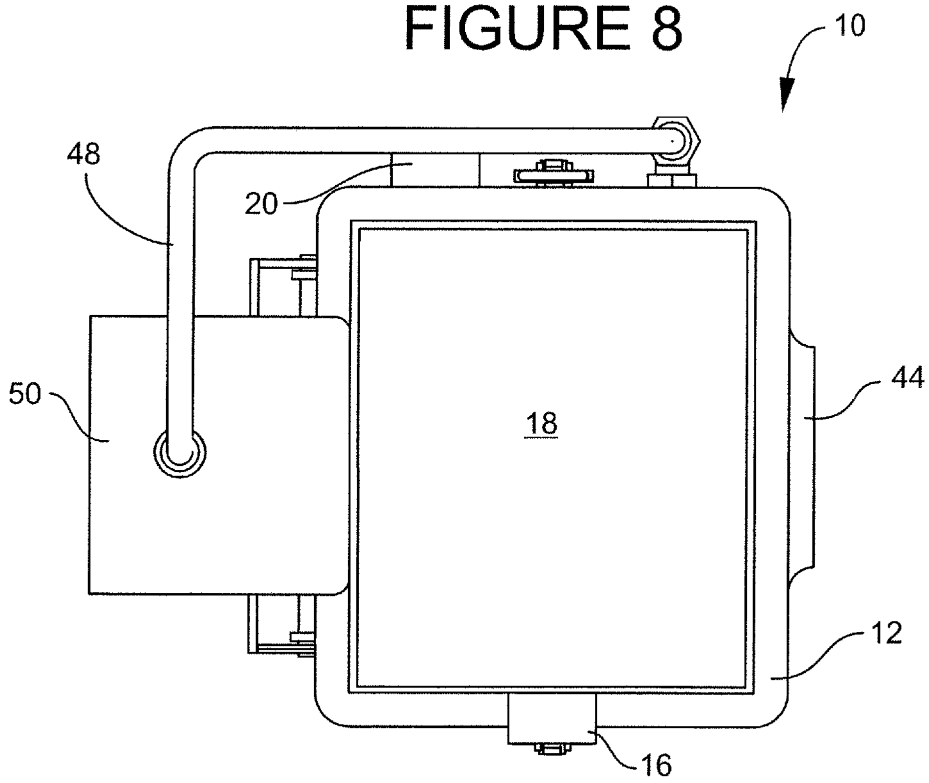
FIG. 9 shows a bottom view of the embodiment of the square ink filter vessel for a printing press shown in FIG. 2.
Figure 10:
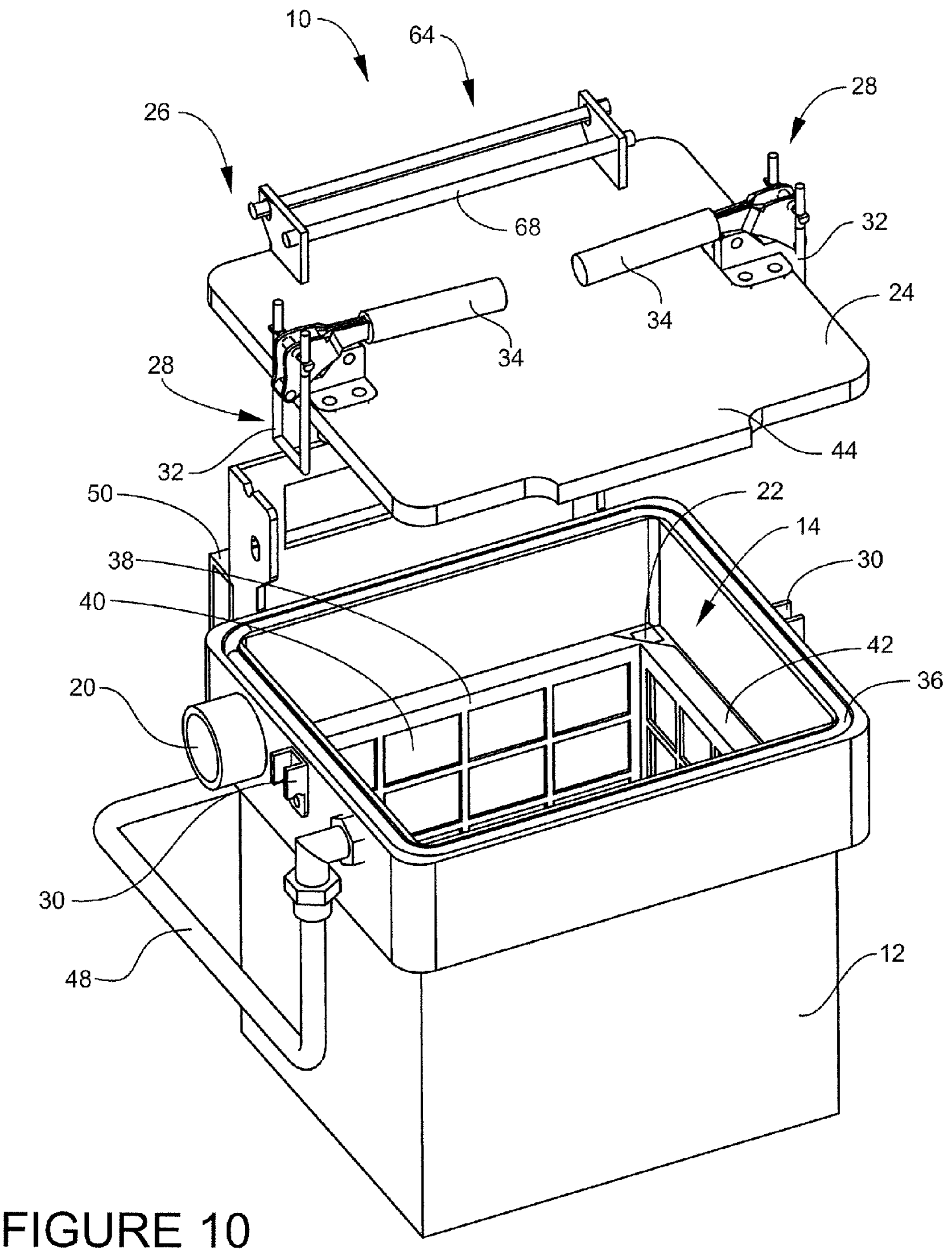
FIG. 10 shows a front perspective view of the embodiment of the square ink filter vessel for a printing press shown in FIG. 2 partially disassembled with the lid removed and the containment basket inside.
Figure 11:
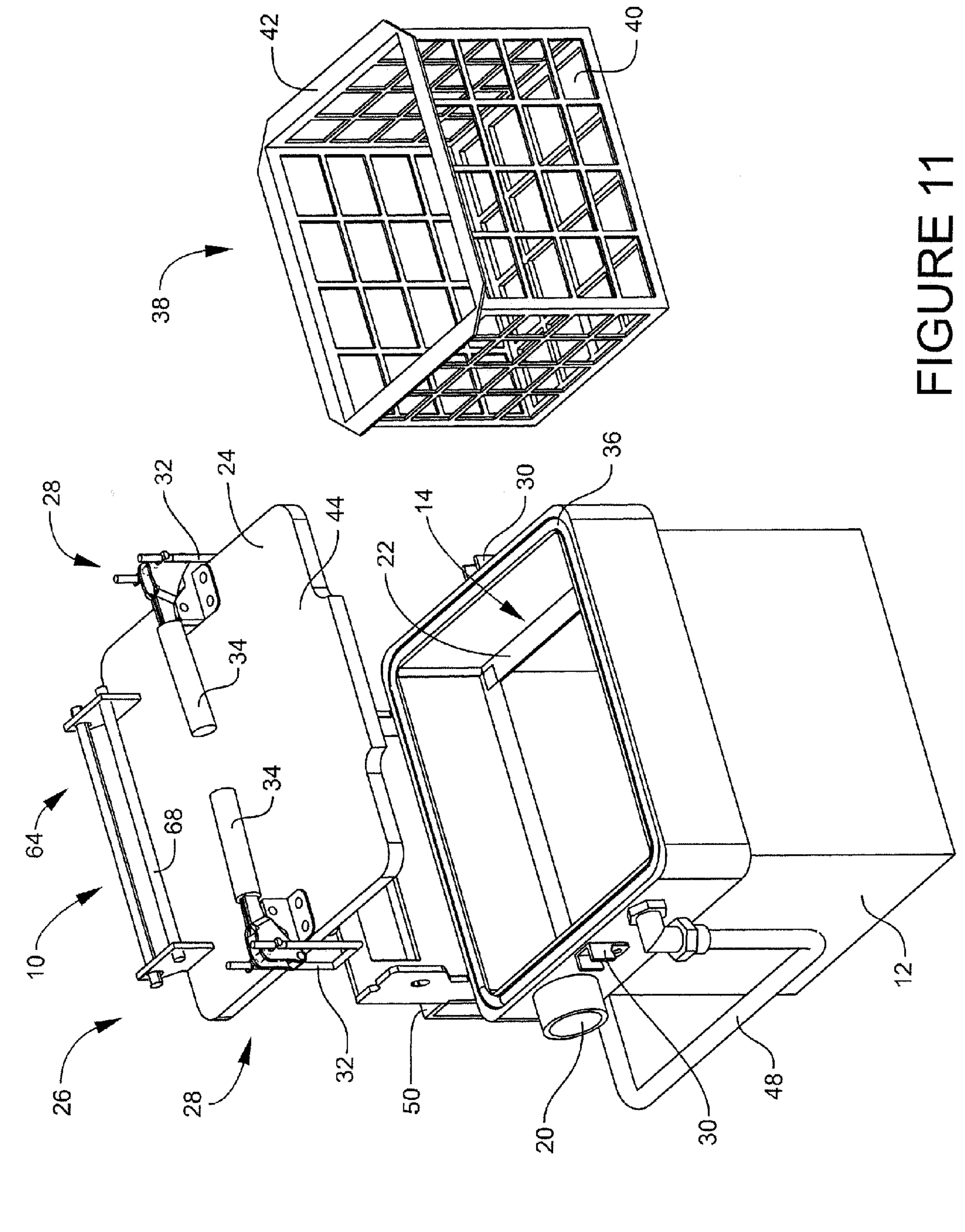
FIG. 11 shows a front perspective view of the embodiment of the square ink filter vessel for a printing press shown in FIG. 2 partially disassembled with the lid removed and the containment basket outside.
Figure 12:
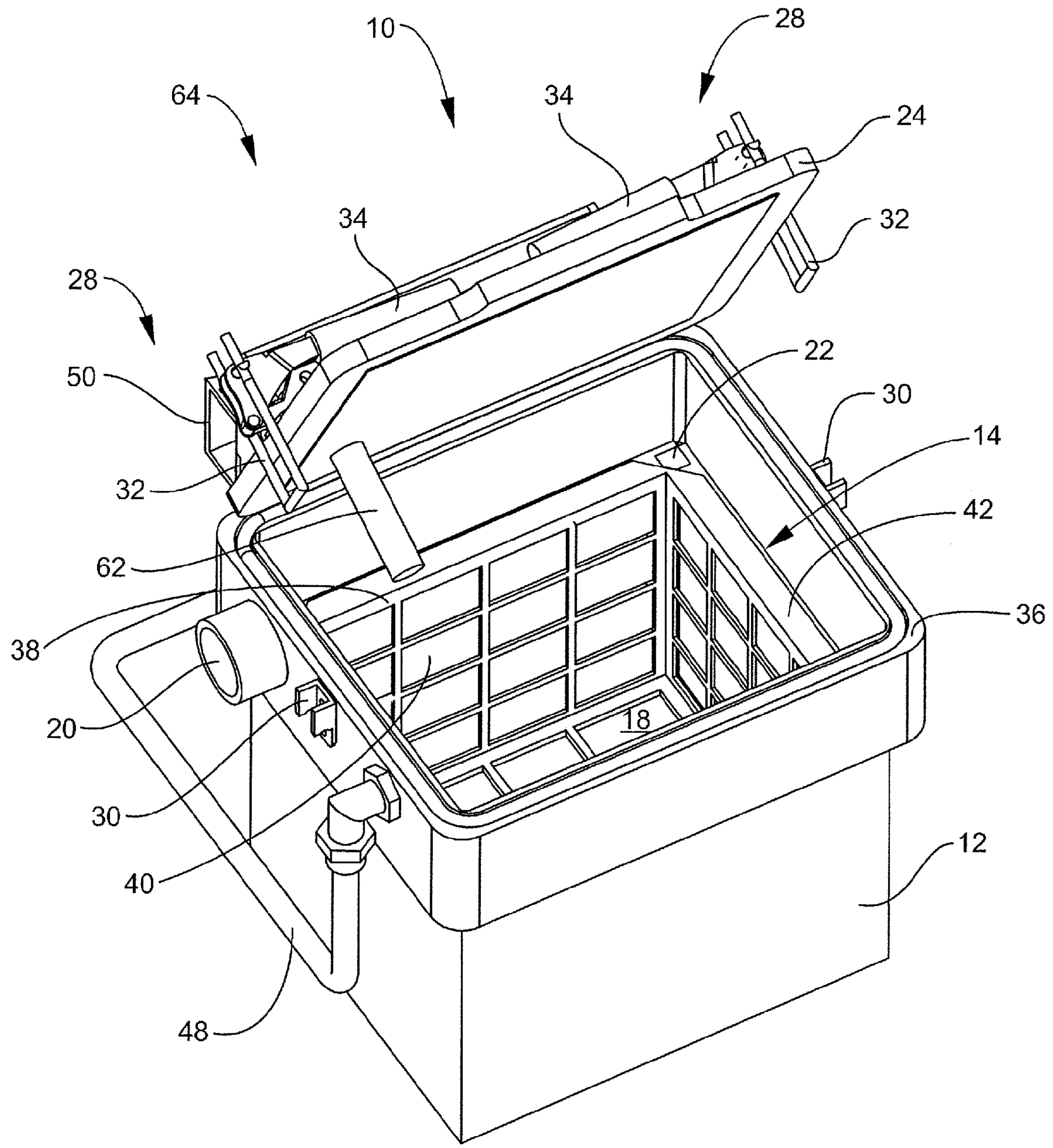
FIG. 12 shows a perspective view of the embodiment of the square ink filter vessel for a printing press shown in FIG. 2 with the lid hinged in an open position.
Figure 13:
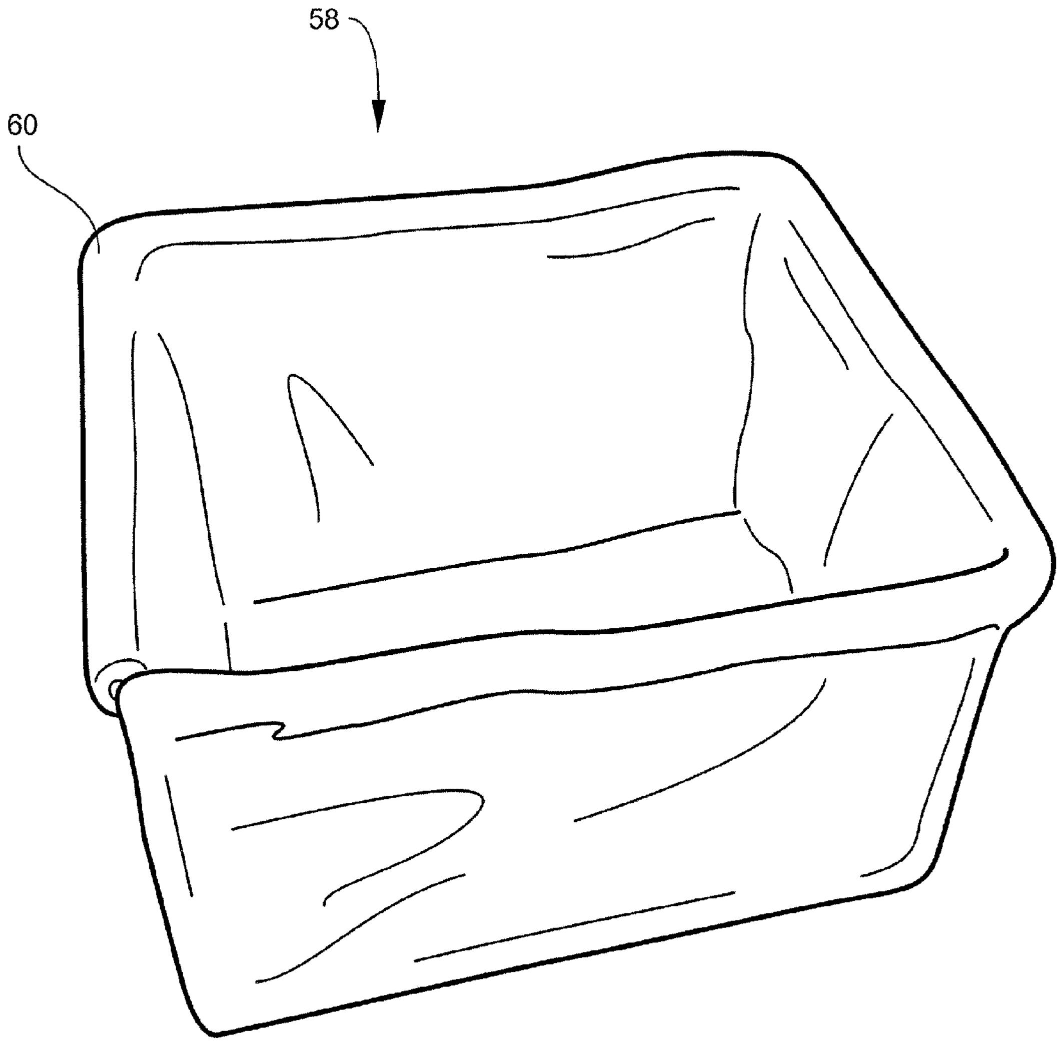
FIG. 13 shows a perspective view of one embodiment of the filter bag of the instant invention.

Referring to FIG. 1, wherein like numerals indicate like elements, the prior art design of a torpedo shaped or cylindrical shaped ink filter vessel 1 for a rotogravure printing press or flexographic printing press is generally shown. The current torpedo shaped or cylindrical shaped ink filter vessel 1 includes a torpedo body 2 with a cylindrical containment tube 6 that fits inside of the torpedo body 2 for housing a cylindrical filter bag 7. This torpedo shaped or cylindrical shape to the body 2 requires the ink filter vessel 1 to have a certain height 8. The height 8 of the prior art vessel 1 has to be at least 18 inches in order to provide adequate filter surface area. This height of the torpedo shaped vessels limits the positions and places prior art vessel 1 may be installed on or around the printing press. This height also makes the installation of this vessel 1 difficult, if not impossible, on certain areas of a rotogravure printing press, a flexographic printing press, or other like printing presses. In addition, a lid 3 closes the open top of the torpedo body 2. The lid 3 requires two nuts, a first nut 4 and a second nut 5, for securing the lid 3 onto the torpedo body. Thus, the removal and attachment of lid 3 requires the turning of two nuts which can be time consuming and complicated.

Referring now to the remaining drawings, FIGS. 2-13, wherein like numerals indicate like elements, there is shown in the Figures an embodiment of a square ink filter vessel 10 for a printing press, like a rotogravure printing press, a flexographic printing press, or other similar printing presses. Square ink filter vessel 10 may be a filter for each ink of a printing press. Although, square ink filter vessel 10 may be designed for a rotogravure printing press and/or a flexographic printing press, it should be understood, that square ink filter vessel 10 may be for filtering ink for other type printing presses, or other ink and printing devices. One key feature to square ink filter vessel 10 may be its height 52. As discussed above, current ink filter vessels for rotogravure and flexographic printing presses, like the torpedo shaped ink filter vessel 1 of FIG. 1, require the height of the ink filter vessel to be at least 18 inches in order to provide enough filtering surface area. With the square shape of vessel 10 of the instant invention, the height 52 may be less than 10 inches. This relatively small height of vessel 10, compared to the current torpedo shaped vessels, may allow it to be more easily installed in and around the printing press, including in smaller locations. In one embodiment, height 52 may be between approximately 3 inches and approximately 8 inches. In another embodiment, height 52 may be approximately 6 inches. Square ink filter vessel 10 may generally include a container 12, a lid 24, a hinge 26, a lid compression device 28, and a containment basket 38.

Container 12 may be included in square ink filter vessel 10. See FIGS. 2-12. Container 12 may be for providing a reservoir for housing the ink to be filtered by vessel 10. Container 12 may be any container capable of housing the ink to be filtered by vessel 10. Container 12 may have a substantially rectangular shaped cross-section. In one embodiment, container 12 may have a substantially square shaped cross-section. Container 12 may also have an open top 14. Open top 14 may be for allowing containment basket 38 and filter bag 58 to be inserted into and removed from square ink filter vessel 10. Open top 14 may also be for allowing a user to inspect and clean the inside of container 12. Container 12 may have a width 54 and a length 56. Container 12 may have any thickness, including, but not limited to, 0.5 inches.

An outlet port 16 may be included on container 12 of square ink filter vessel 10. See FIGS. 3, 5-7 and 9. Outlet port 16 may be for moving ink out of container 12. Outlet port 16 may be any port capable of removing ink from container 12 and may be positioned anywhere on container 12. In one embodiment, outlet port 16 may be positioned approximate to the bottom of container 12. This position of outlet port 16 may allow for container 12 to be drained. Outlet port 16 may be positioned at the bottom of container 12 at the center of one of its sides. To facilitate draining through outlet port 16, container 12 may include a sloped bottom 18. See FIGS. 9 and 12. Sloped bottom 18 may be for draining liquid out of outlet port 16. Sloped bottom 18 may be sloped toward outlet port 16. Sloped bottom 18 may be any degree of slope, including, but not limited to having a rise of approximately 0.5 inches or approximately 0.3125 inches.

An inlet port 20 may be included on container 12 of square ink filter vessel 10. See FIGS. 2, 4, 6, 8-12. Inlet port 20 may be for moving ink into container 12. Inlet port 20 may be any port capable of moving ink into container 12 and may be positioned anywhere on container 12. In one embodiment, inlet port 20 may be positioned approximate the top of container 12. This may allow for ink to be pumped into the top of container 12 and into a filter bag 58.

An internal ledge 22 may be included in container 12 of square ink filter vessel 10. See FIGS. 10-12. Internal ledge 22 may be for providing a surface for the lip 42 of containment basket 38 to rest on inside container 12. Internal ledge 22 may be any type of surface capable of providing a place for lip 42 to rest on inside container 12. In one embodiment, internal ledge 22 may be an internal ledge completely around the inside of rectangular container 12. Internal ledge 22 may be positioned a distance below the open top 14 to allow ink to be pumped into filter bag 58. This distance may be any distance, including, but not limited to, a distance between approximately 1.5 inches and 2 inches from the top of container 12. Internal ledge 22 may also have any width, including, but not limited to, having a width of approximately 0.5 inches.

Lid 24 may be included with square ink filter vessel 10. See FIGS. 2-5, 8, 10-12. Lid 24 may be adapted to close the top of open top 14 of container 12. Lid 24 may be any device capable of closing the top of open top 14 of container 12. In one embodiment, lid 24 may be shaped to fit the cross-section of the open top 14 of container 12. In another embodiment, lid 24 may include a handle 44 for lifting lid 24. Handle 44 may be any device adapted for lifting lid 24. Handle 44 may be integrally built onto lid 24 or may be connected to lid 24. In one embodiment, handle 44 may be a protruding portion of lid 24 that protrudes beyond the edge of container 12 for allowing a user to lift lid 24. Handle 44 may be positioned anywhere on lid 24, including, but not limited to, on the front side of square ink filter vessel 10 for allowing easy access to open lid 24.

A hinge 26 may be included with square ink filter vessel 10. See FIGS. 2-8, 10-12. Hinge 26 may be for coupling lid 24 to container 12 where lid 24 may open off of container 12. Hinge 26 may be any hinge capable of coupling lid 24 to container 12 where lid 24 may open off of container 12. Hinge 26 may be positioned anywhere on container 12 and lid 24. Hinge 26 may be a single hinge, where lid 24 is coupled to container 12 on only one side. In one embodiment, hinge 26 may be positioned on the back side of container 12 and lid 24, where hinge 26 may be on the opposite side of handle 44. In one embodiment, hinge 26 may include a hinge lock 64. Hinge lock 64 may be adapted for holding lid 24 in an open position. This hinge lock feature of hinge 26 may prevent lid 24 from accidentally closing and causing injury and may allow a user to access the inside of container 12 without having to hold lid 24 open. Hinge lock 64 may be any device capable of holding lid 24 in an open position. In one embodiment, hinge lock 64 may be a groove 66 or plurality of grooves 66 adapted for receiving a bar 68 mounted on the top of lid 24. In this embodiment, hinge 26 may include a slotted hole 70 that allows bar 68 to rotate into grooves 66. Once bar 68 is positioned in grooves 66, lid 24 will be locked into or held in an open position.

A lid compression device 28 may be included in square ink filter vessel 10. See FIGS. 2-8, 10-12. Lid compression device 28 may be for compressing lid 24 onto the open top 14 of container 12. Lid compression device 28 may allow lid 24 to be sealed or pressurized to the open top 14 of container 12. Lid compression device 28 may be any device capable of compressing lid 24 onto the open top 14 of container 12. Square ink filter vessel 12 may include any amount of lid compression devices 28, including, but not limited to, one lid compression device 28 opposite of hinge 26, two lid compression devices 28 as depicted in the Figures, three lid compression devices 28 with one on each side except for the side with hinge 26, and/or multiple lid compression devices 28 on one or all sides of vessel 10. In one embodiment, lid compression device 28 may include a side bracket 30, a connecting arm 32, and a lever arm 34. The side bracket 30 may be connected to the side of container 12 and may be adapted to receive the bottom of connecting arm 32. Connecting arm 32 may be a generally U-shaped bar that may be connected to lever arm 34. Lever arm 34 may be mounted to the top of lid 24 and may be utilized to lift connecting arm 32. In operation, when lid 24 is closed on container 24 and lever arm 34 may be rotated vertically, connecting arm 32 may be positioned below side bracket 30. Lever arm 34 may then be rotated down on to lid 24 which raises connecting arm 34 and, as a result, compresses lid 24 onto the open top 14 of container 12. This operation of sealing and pressurizing lid 24 to the open top 14 of container 12 with lid compression device 28 does not require any nuts or screws to be turned, and is thus, relatively simple and fast to operate.

A seal 36 may also be included in square ink filter vessel 10. See FIGS. 10-12. Seal 36 may be for aiding lid 24 to seal to the open top 14 of container 12. Seal 36 may be any type of seal capable of aiding lid 24 to seal to the open top 14 of container 12. In one embodiment, seal 36 may be a rubber seal positioned completely around the open top 14 of container 12.

A containment basket 38 may also be included with square ink filter vessel 10. See FIGS. 10-12. Containment basket 38 may be for holding or containing the filter bag 58 within container 12 while allowing ink to flow through filter bag 58. Containment basket 38 may be a substantially rectangular shaped basket adapted to fit inside container 12. In one embodiment, containment basket 38 may have a plurality of holes 40 on all sides and a lip 42 adapted to rest on internal ledge 22 of container 12. Plurality of holes 40 may allow ink to flow freely into and out of filter bag 58.

A filter bag 58 may also be included with square ink filter vessel 10. See FIG. 13. Filter bag 58 may be for filtering the ink flowing through square ink filter vessel 10. Filter bag 58 may be any device for filtering the ink flowing through square ink filter vessel 10. Filter bag 58 may be adapted to fit inside containment basket 38 and may have a substantially rectangular cross-section. Filter bag 58 may also have a collar 60. Collar 60 may be positioned at the at the top of filter bag 58. Collar 60 may be for holding filter bag 58 in the correct position in containment basket 38. Collar 60 may be adapted to rest on the top of containment basket 38. Filter bag 58 may be made out of any known material for filtering ink.

A mounting bracket 50 may also be included with square ink filter vessel 10. See FIGS. 2-6, 8-12. Mounting bracket 50 may be for mounting square ink filter vessel 10 to an object. This feature may allow square ink filter vessel 10 to be positioned off of the ground. Mounting bracket 50 may be any device capable of mounting square ink filter vessel 10 to another object. Mounting bracket 50 may be integrally built onto container 12 or may be added to container 12. Mounting bracket 50 may be positioned anywhere on container 12, including, but not limited to, connected to the back side of container 12. Mounting bracket 50 may include a plurality of holes for attaching mounting bracket 50 to another object. Mounting bracket 50 may also house a pressure gage 46.

Pressure gage 46 may be included with square ink filter vessel 10. See FIGS. 3-6, and 8. Pressure gage 46 may be for monitoring and displaying the amount of pressure of the ink inside container 12. Pressure gage 46 may be any pressure gage capable of monitoring and displaying the amount of pressure of the ink inside container 12. Pressure gage 46 may be attached anywhere on container 12, including, but not limited to, near the top of container 12. Pressure gage 46 may be connected to container 12 directly, or may be connected to container 12 through a pressure line 48. Pressure line 48 may allow pressure gage 46 to be mounted on different locations on square ink filter vessel 10 or even separate from square ink filter vessel 10. In one embodiment, pressure line 48 may allow pressure gage 46 to be positioned on mounting bracket 50 on the back side of square ink filter vessel 10.

A magnet 62 may be included with square ink filter vessel 10. See FIG. 12. Magnet 62 may be for removing metallic debris from the ink in container 12. Magnet 62 may be any magnet for removing metallic debris from the ink in container 12. In one embodiment, magnet 62 may be an encapsulated rare earth magnet. Magnet 62 may be positioned anywhere within container 12. In one embodiment, magnet 62 may be positioned on the underside of lid 24 approximate to the inlet 20. This embodiment may allow the magnet to be exposed to the ink as soon as it enters square ink filter vessel 10, thereby, removing the metallic debris from the ink before the ink goes through filter bag 58.

The instant invention may be embodied in other forms without departing from the spirit and the essential attributes thereof, and, accordingly, reference should be made to the appended claims, rather than to the foregoing specification, as indicated in the scope of the invention.

I claim:

1. An ink filter vessel for a printing press comprising:

a container with a substantially rectangular shaped cross-section and an open top;

said container having an outlet port on one side approximate the bottom of said container, a sloped bottom, where said sloped bottom being toward said outlet port, an inlet port on one side approximate the top of said container, and an internal ledge;

a lid being adapted to close the top of said container;

a hinge coupling said lid to said container, where said lid being hinged to said container on one side;

a lid compression device being adapted to compress said lid to said container; and a containment basket being adapted to fit inside said container, said containment basket having a plurality of holes on all sides and a lip adapted to rest on said internal ledge of said container.

2. The ink filter vessel for a printing press of claim 1 wherein said lid compression device comprising:

a side bracket extending from the side of said container;

a connecting arm being attached to the top of said lid adapted to engage said side bracket; and a lever arm adapted to pull said connecting arm up, thereby compressing said lid onto the top of said container.

3. The ink filter vessel for a printing press of claim 1 comprising two lid compression devices, where one lid compression device being positioned on one side of said vessel, and the other lid compression device being positioned on the opposite side of said vessel.

4. The ink filter vessel for a printing press of claim 1 further comprising a seal being adapted to seal said lid to said container.

5. The ink filter vessel for a printing press of claim 4 wherein said seal being a rubber seal positioned completely around said open top of said container.

6. The ink filter vessel for a printing press of claim 1 further comprising a handle being attached to said lid on the opposite side of said hinge being a protruding portion of said lid.

7. The ink filter vessel for a printing press of claim 1 wherein said hinge further comprising a hinge lock adapted for holding said lid in an open position.

8. The ink filter vessel for a printing press of claim 7 wherein said hinge lock comprising:

a groove or plurality of grooves on the top side of said hinge;

a bar mounted to the top side of said hinge; and a slotted hole incorporated in said hinge adapted for allowing said bar to rotate into said grooves;

wherein, said bar being adapted to rest in said grooves or plurality of grooves when said lid being in said open position.

9. The ink filter vessel for a printing press of claim 1 further comprising a mounting bracket adapted for mounting said ink filter vessel to another object, said mounting bracket being connected to the back side of said container.

10. The ink filter vessel for a printing press of claim 1 further comprising a pressure gage adapted to monitor the pressure of the ink inside said container.

11. The ink filter vessel for a printing press of claim 10 wherein said pressure gage including a pressure line connected to the side of said container approximate to the top of said container.

12. The ink filter vessel for a printing press of claim 10 wherein said pressure gage being mounted in said mounting bracket on the back of said container.

13. The ink filter vessel for a printing press of claim 1 further comprising a magnet adapted for removing metallic debris from the ink in said container.

14. The ink filter vessel for a printing press of claim 13 wherein said magnet being attached to the underside of said lid approximate to said inlet and being an encapsulated rare earth magnet.

15. The ink filter vessel for a printing press of claim 1 wherein said container having a height of less than approximately 10 inches.

16. The ink filter vessel for a printing press of claim 15 wherein said container having a height of between approximately 3 inches and approximately 8 inches.

17. The ink filter vessel for a printing press of claim 1 further comprising a filter bag being adapted to fit inside said containment basket, said filter bag having a substantially rectangular cross-section.

18. The ink filter vessel for a printing press of claim 17 wherein said filter bag including a collar at the top of said filter bag adapted to hold said filter bag in the correct position in said containment basket, said collar being adapted to rest on the top of said containment basket.

* * * * *